United States Patent
Landon

(10) Patent No.: US 6,637,369 B1
(45) Date of Patent: Oct. 28, 2003

(54) COVERED LIVESTOCK FEEDER FOR FIELD USE

(76) Inventor: Dennis L. Landon, 1162 Hwy. 98 West, Lucedale, MS (US) 39452

( * ) Notice: Subject to any disclaimer, the term of this patent is extended or adjusted under 35 U.S.C. 154(b) by 0 days.

(21) Appl. No.: 10/158,702

(22) Filed: May 30, 2002

(51) Int. Cl.[7] ............................... A01K 1/10; A01K 5/00
(52) U.S. Cl. ........................................ 119/60; 119/58
(58) Field of Search ...................... 119/58, 60, 61

(56) References Cited

U.S. PATENT DOCUMENTS

| | | | | |
|---|---|---|---|---|
| 112,133 A | * | 2/1871 | Farquhar | 119/60 |
| 449,303 A | * | 3/1891 | Warren | 119/60 |
| 4,070,991 A | * | 1/1978 | Schmiesing | 119/58 |
| 4,077,359 A | * | 3/1978 | Amurri | 119/58 |
| 5,205,241 A | * | 4/1993 | Halpin et al. | 119/60 |
| 5,465,684 A | * | 11/1995 | Dyson | 119/60 |

* cited by examiner

*Primary Examiner*—Charles T. Jordan
*Assistant Examiner*—Elizabeth Shaw
(74) *Attorney, Agent, or Firm*—RatnerPrestia

(57) ABSTRACT

A prism shaped open tubular frame livestock feeder including a cover extending over opposite ends of the feeder permitting livestock to access forage held in the feeder. The feeder includes a removable base to support the forage, removable cover over the feeder and sides of the feeder where livestock cannot access the forage, covered end portions where livestock can access forage and a flexible weather curtain on ends of the feeder accessible by the livestock that can be moved by livestock to access the forage.

13 Claims, 5 Drawing Sheets

COVERED LIVESTOCK FEEDER FOR FIELD USE

BACKGROUND OF THE INVENTION

The present invention pertains to outdoor feeders used to hold forage, e.g. hay, for feeding livestock such as horses.

Livestock, such as horses, that are allowed to roam in large pastures must be provided with additional forage when the pasture has stopped growing or the pasture has been eaten down to the point where the horses can not obtain forage. In those instances the livestock owner must provide forage usually in the form of bales of hay that are taken to the field and left for consumption by the livestock. It is well known that if the hay bales are broken into, as they must be to feed the animals, the hay becomes exposed to moisture, either rain or snow, then the hay will rot and will not be usable as feed.

Various solutions have been proposed in the form of covered devices to protect the hay from the elements. While the simplest form of protection is to put a canopy over the hay this is usually not adequate since the animals can drag the hay about and once it is moved from under the canopy it becomes exposed to the elements and will deteriorate or rot.

Therefore, there is a need for a covered livestock feeder that will protect the hay from the elements while containing the hay so that it can not be strewn about by the livestock.

BRIEF DESCRIPTION OF THE INVENTION

The present invention is a covered livestock feeder comprising in combination; a base portion having the general shape of a square prism with top and bottom portions of the square prism being open and the sides of the square prism adapted to contain a quantity of livestock forage, the base portion adapted to support a removal bottom floor portion for holding said forage; two opposite sides of the base portion adapted to permit livestock to access the forage from outside the base with the remaining opposite ends of the base adapted to prevent access of the livestock to the forage; a cover support structure adapted to receive one of a removable water proof and removable water repellant cover fixed to the base with opposite end portion extending over and beyond the opposite end portions of the base where livestock can access the forage, whereby when the cover is applied to the cover support structure the base is covered and the cover extends beyond the opposite end portion of the base permitting livestock to access the forage while protecting the forage from adverse weather conditions.

BRIEF DESCRIPTION OF THE DRAWINGS

FIG. 5b is an isometric view showing the bottom surface of the removable bottom floor of FIG. 5a.

DETAILED DESCRIPTION OF THE INVENTION

Figure 1:
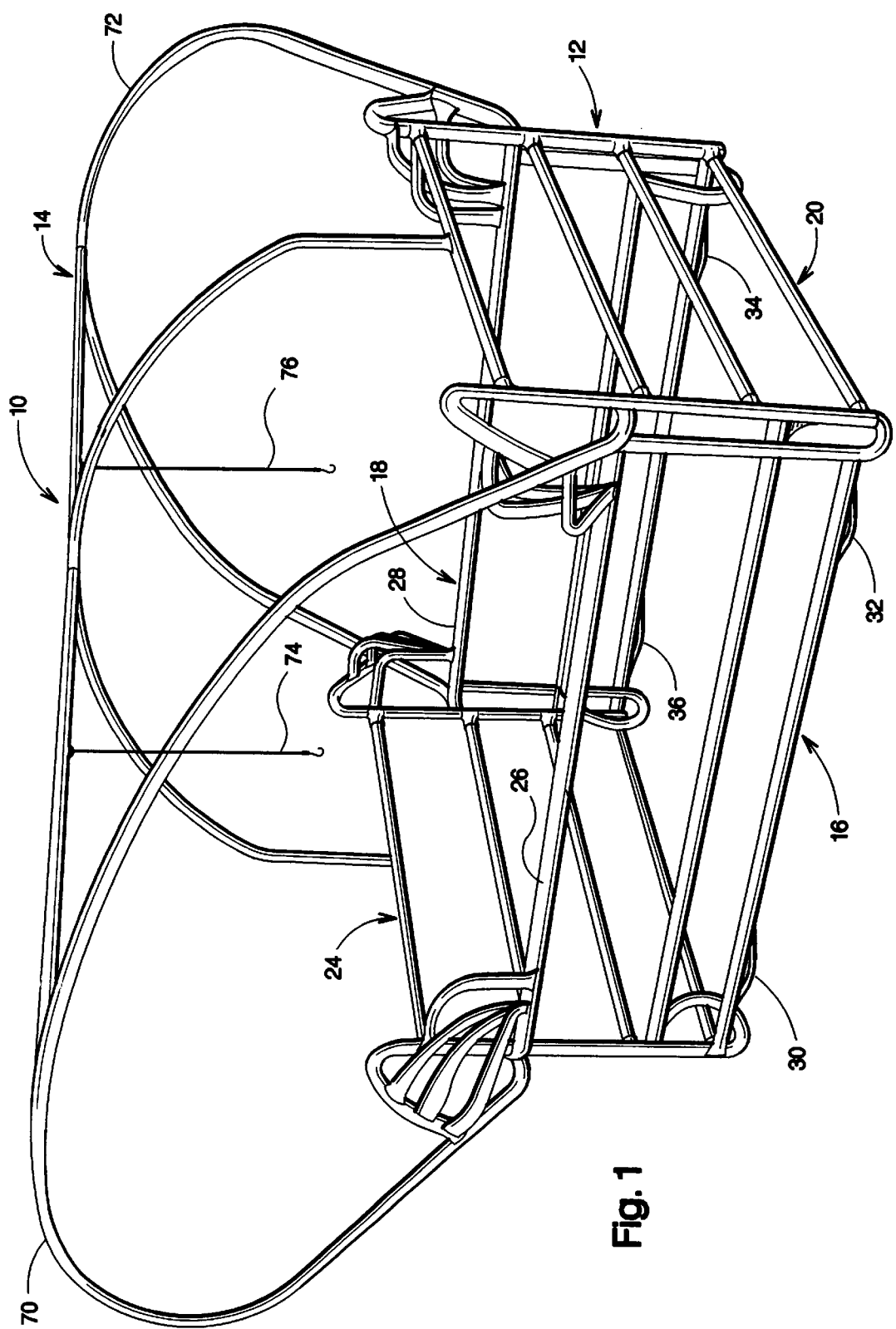
FIG. 1 is an isometric drawing of a livestock feeder according to the present invention.

Referring to FIG. 1 the livestock feeder 10 consists of a base portion shown generally as 12 and a cover support structure 14.

The entire feeder structure shown in FIG. 1 can be manufactured from tubular material such as 16 or 18 gage galvanized steel tubing. The various parts of the feeder can be assembled permanently as by a welding or the various parts can be fabricated and joined together by conventional joining techniques such as slip fittings, bolting or the like, so that the entire livestock feeder can be portable or disassembled for shipping purposes.

The base portion 12 includes two animal access sides 16 and 18, which are lower in height than the other two opposite sides 20, 24. The purpose of the lower sides 16 and 18 is to permit the livestock to approach the feeder 10 reach over the top portions or rails 26 and 28 to gain access to the feed contained therein as will hereinafter be more fully explained.

Figure 2:
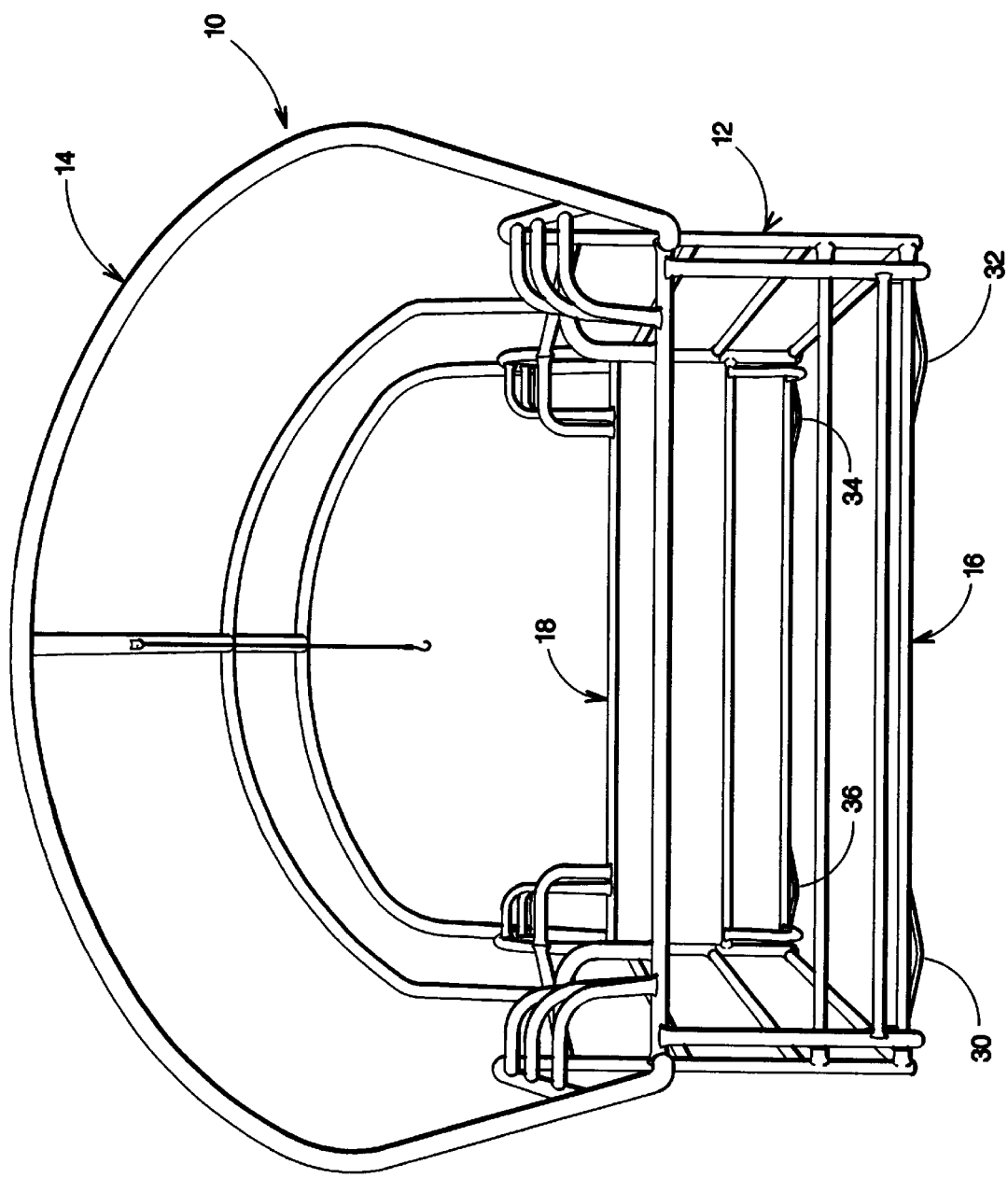
FIG. 2 is a front elevational view of the livestock feeder of FIG. 1.

Referring to FIG. 2 the feeder 10 base portion 12 includes on each of the bottom portion of ends 16 and 18 hangers 30, 32, 34 and 36 to support a removable bottom.

Figure 3:
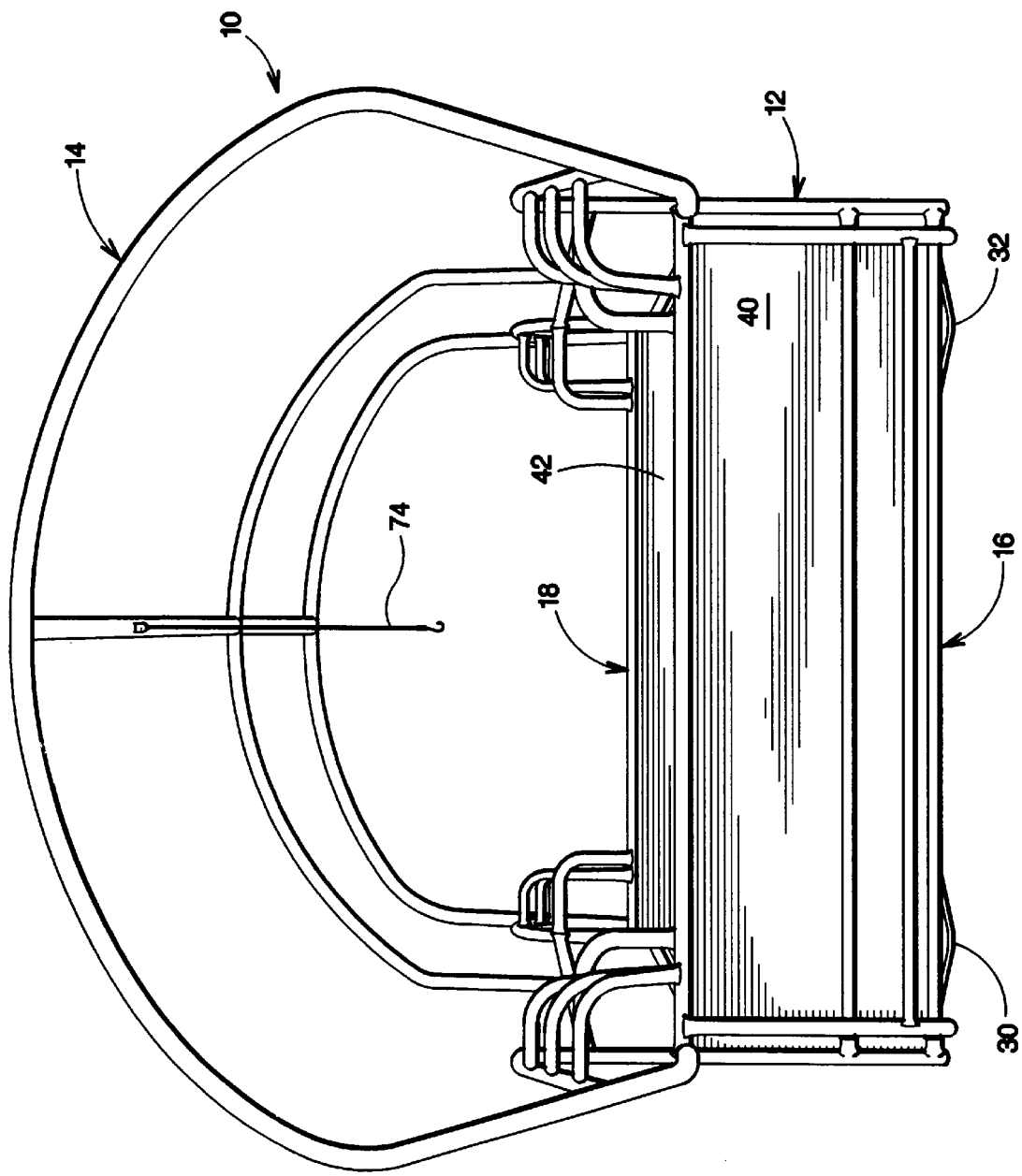
FIG. 3 is a front elevational view of the livestock feeder of FIG. 1 with protective panels shown in place.

As shown in FIG. 3 the ends 16 and 18 of base portion 12 can be closed by panels 40 and 42, which can be of a rigid or semi rigid plastic material to prevent moisture from being splashed on the hay contained in the base portion 12.

Figure 4:
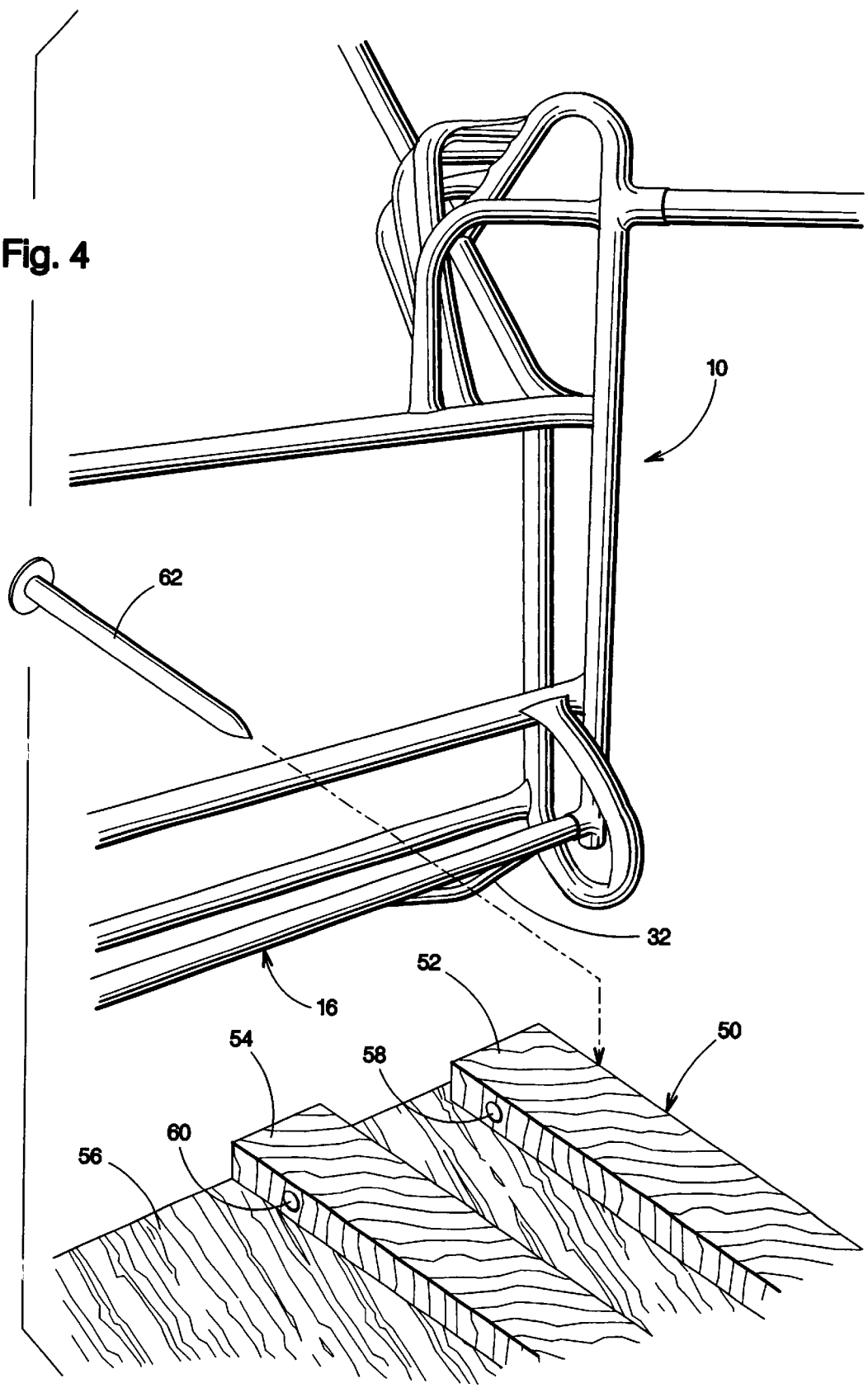
FIG. 4 is a fragmentary isometric view illustrating the method of installing a removable bottom in the feeder of FIG. 1.

Referring to FIG. 4 the removable bottom 50 shown inverted in FIG. 4 is provided with a plurality of battens or stiffeners 52, 54 placed on the underside of the food support platform 56 of removable bottom 50. The outermost battens 52, 54 are provided with through holes or apertures 58, 60, which are adapted to receive a pin 62, which is placed in the pin support or holder 32 so that the food support platform 56 can be positioned above the ground surface to keep the hay off of the ground and away from ground moisture.

Figure 5A:
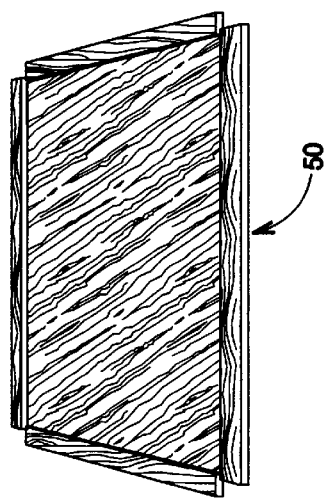
FIG. 5a is an isometric view showing the top surface of the removable bottom floor of the livestock feeder of FIG. 1.
Figure 5B:
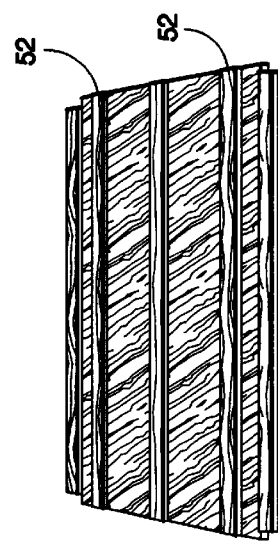

The feed support 50 is shown in FIGS. 5a and 5b with a smooth top surface (FIG. 5a) so that the hay can be readily positioned for access by the livestock.

Referring back to FIG. 1 the cover support structure 14 is in the general shape of the covering for the well known historical conestoga wagon. The covered support structure 14 has a first end 70 and a second end 72 each end of which is adapted to project over the ends 16 and 18 of the base portion so that as the livestock approach the feeder the open end portions of the feeder are protected from the elements when a cover is installed over the cover support structure 14. Also included in the cover support structure 14 are a pair of flexible elastic cords 74, 76, which are used to support a movable weather curtain 82.

Figure 6:
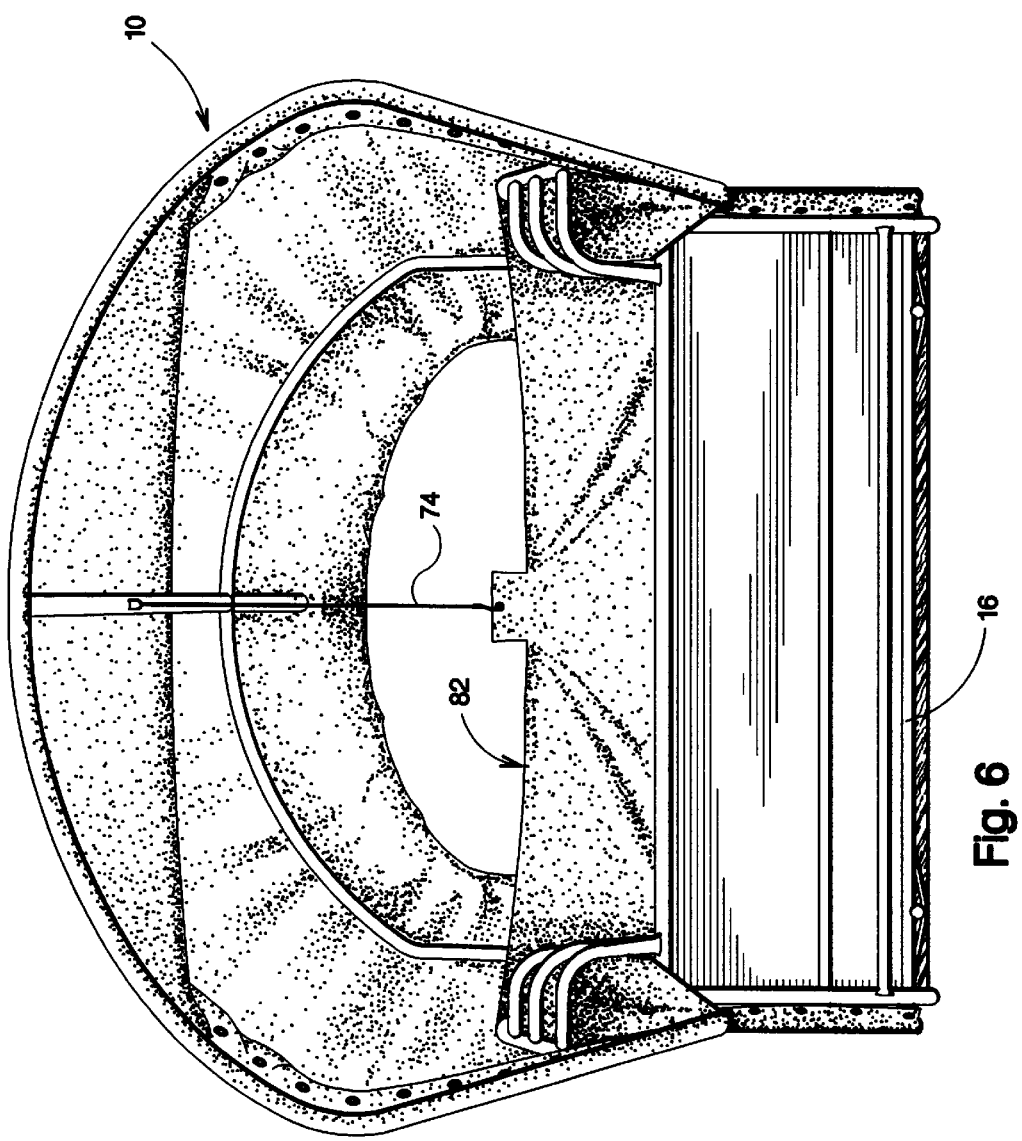
FIG. 6 is a front elevational view of the feeder of the invention with the cover installed, also illustrating an optional weather curtain feature.

Referring to FIG. 6 the feeder 10 is illustrated with a full cover in place, the cover made of a suitable water resistant or water repellent material such as treated canvas or any of the well known tent materials. The cover is made to fit entirely over the support structure 12 as shown and to cover the sides 20 and 24 of the base portion of the feeder. The cover 80 can be fastened to the frame in any conventional manner by tying or any of the well known techniques used by tent makers to cover a frame of a frame tent.

On each end 16 and 18 of the feeder 10 is an auxiliary weather curtain 82, which is fixed to either side of the cover support structure 14 as shown in FIG. 6. The weather curtain 82 is made of the same material as the cover 80 and is made so that it will sag downwardly when pushed by an animal approaching the feeder to obtain hay. The weather curtains are supported in a vertical position by the flexible cords, 74, 76 (e.g. as illustrated by cord 74), so that the animals can readily move the weather curtain 82 to obtain feed. Cords 74, 76 can be the well known bungee type cord.

With a feeder according to the present invention assembled and covered as shown and described, hay placed inside of the feeder is protected from the elements while being readily accessible by horses or other livestock in the field. The hay is supported off of the ground and out of the elements so that it is protected from premature rot or deterioration from the elements. The materials of construction and the methods of enclosing the feeder can be any of those conventionally used in the manufacture of open frame type structures such as tents and the like.

Having thus described my invention what is desired to be secured by Letters Patent of the United States is set forth in the appended claims which should be read without limitation.

What is claimed is:

1. A portable covered livestock feeder comprising in combination:
    a base portion having the general shape of a square prism with top and bottom portions of said square prism being open with said sides of said square prism adapted to contain a quantity of livestock forage, said base portion adapted to support a removable bottom floor portion for holding said forage;
    two opposite sides of said base portion adapted to permit livestock to access said forage from outside said base with the remaining opposite sides of said base portion adapted to prevent access of said livestock to said forage; and
    a cover support structure adapted to receive one of a removable water proof and removable water repellant cover fixed to said base with opposite end portions extending over and beyond the opposite end portions of said base where livestock can access said forage, whereby when said cover is applied to said cover support structure said base is covered and said cover extends beyond said opposite end portions of said base permitting livestock to access said forage while protecting said forage from adverse weather conditions.

2. A covered livestock feeder according to claim 1, wherein said base is an open tubular structure.

3. A covered livestock feeder according to claim 2, including removable panels to close said ends of said base permitting livestock to access said forage.

4. A covered livestock feeder according to claim 1, wherein said cover support structure is fabricated from tubular material and said cover extends over said cover support structure and over said opposite sides of said base which prevent access of said livestock to said base portion.

5. A covered livestock feeder according to claim 4, including a weather curtain on said ends of said feeder extending upwardly from a top of each of said sides of said base portion permitting access by livestock to said forage, said weather curtain adapted to be moved downwardly by said livestock to access said forage.

6. A covered livestock feeder according to claim 5, wherein said weather curtains are held in a vertical portion by an elongated, flexible, elastic cord disposed between a central edge portion of said weather curtain and said cover support structure.

7. A covered livestock feeder according to claim 1, fabricated from galvanized steel tubing.

8. A covered livestock feeder according to claim 1, wherein said removable bottom floor portion is fabricated from wood treated to resist rot.

9. A covered livestock feeder according to claim 1, wherein said removable floor portion is held in said base portion by removable pins supported in said base portion and extending into said floor portion.

10. A covered livestock feeder according to claim 1, wherein said ends of said base portion permitting access by said livestock are covered by a solid plastic material.

11. A covered livestock feeder comprising in combination:
    a base portion having the general shape of a square prism with top and bottom portion of said square prism being open with said sides of said square prism adapted to contain a quantity of livestock forage, said base portion adapted to support a removal bottom floor portion for holding said forage said base portion being an open tubular structure;
    two opposite sides of said base portion being removable portions adapted to permit livestock to access said forage from outside said base with the remaining opposite sides of said base adapted to prevent access of said livestock to said forage;
    a cover support structure fabricated from tubular material and adapted to receive one of a removable water proof and removable water repellant cover fixed to said base with opposite end portions extending over and beyond said opposite end portions of said base where livestock can access said forage, whereby when said cover is applied to said cover support structure said base is covered and said cover extends beyond said opposite end portions of said base permitting livestock to access said forage while protecting said forage from adverse weather conditions and;
    a weather curtain on said ends of said feeder extending upwardly from a top of each of said sides of said base portion permitting access by livestock to said forage, said weather curtain adapted to be moved downwardly by said livestock to access said forage.

12. A covered livestock feeder according to claim 11, wherein said weather curtains are held in a vertical position by an elongated, flexible, elastic cord disposed between a central edge portion of said weather curtain and said cover support structure.

13. A covered livestock feeder according to claim 11, wherein said removable floor portion is held in said base portion by removable pins supported in said base portion and extending into said floor portion.

* * * * *